June 29, 1926.

F. W. SCHMIDT 1,590,958

RIM

Filed June 12, 1922

Inventor
Frank W. Schmidt
By his Attorneys

Patented June 29, 1926.

1,590,958

UNITED STATES PATENT OFFICE.

FRANK W. SCHMIDT, OF JACKSON, MICHIGAN, ASSIGNOR TO GENERAL MOTORS CORPORATION, OF DETROIT, MICHIGAN, A CORPORATION OF DELAWARE.

RIM.

Application filed June 12, 1922. Serial No. 567,675.

This invention relates to wheels for motor vehicles and more particularly to latching means for rims thereof.

Some of the objects of the invention are the provision of new and improved latching mechanism for transplit rims that is simple in construction, cheap to manufacture, that may be easily latched and unlatched, that is so constructed and arranged that it may form a driver for the rim, and that is provided with new and improved means and arrangement thereof for positively retaining the latch in operative position.

Other and further objects and advantages will appear as the description proceeds.

Figure 1:
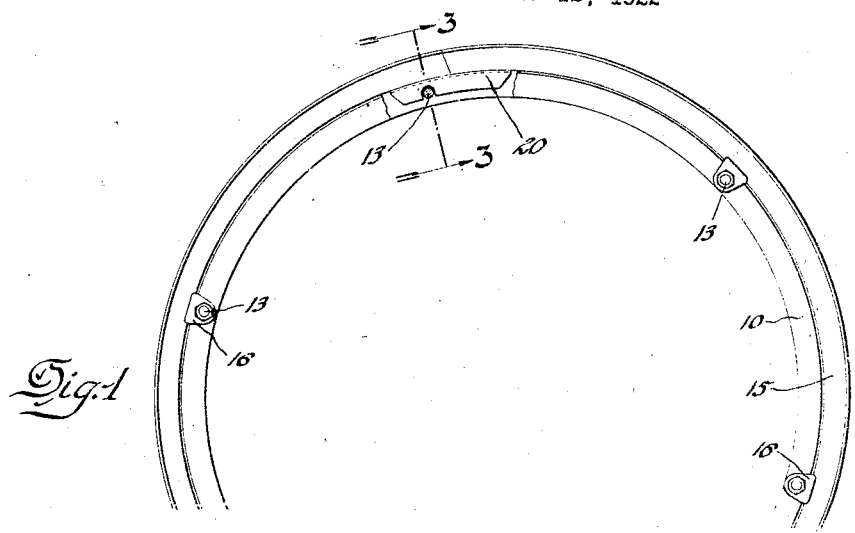
Fig. 1 is a side elevation of a portion of a wheel showing my invention in position thereon, with parts broken away.

On the drawing, the reference numeral 10 designates a felloe which may be, and preferably is, in the form of a channel having the outer flange 11 and the inner flange 12 which are provided with aligned apertures for the reception of the clamp bolts 13, as is usual in such constructions. The flange 12 is provided with an inclined seat 14 on which the demountable rim 15 is adapted to engage. The rim 15 is held in engagement with the seat 14 by the clamp 16 which are held in operative position by the l ts 13. The rim 15 is of the usual or conventional type being U-shaped in cross section and is divided or transplit as at 17 forming the rim ends 18 and 19.

The rim ends 18 and 19 are detachably held in operative position by means of a suitable latch member 20. As formerly constructed these latches were formed from heavy stock in order to meet the strains imposed upon them incident to the operation of the rim and especially is this true where the latch is employed as a driver for the rim. I have found, however, that, by making the latch channel shape, a considerably lighter stock may be employed without detracting from the efficiency of the latch and at the same time materially reducing the expense and cost of manufacture. The latch may be made channel shape in any suitable manner as by stamping to form the web or base portion 21 and the side flanges 22 and 23. The corners 22ᵃ and 23ᵃ formed when the flanges are bent to position are curved and when the latch is in operative position this facilitates the entrance of a tool beneath said latch to disengage the same. The latch member 20 is rigidly secured to the rim end 18 by any suitable means such as the rivets 24 and 25. The flanges 22 and 23 of the latch member are provided with aligned recesses 26 which are adapted to engage one of the clamp bolts 13 to drive the rim 15. These recesses may be provided at any convenient point along the latch member, in order that the wedge or clamp 16 may engage the rim ends at either or both sides of the split 17, as desired.

Figure 2:
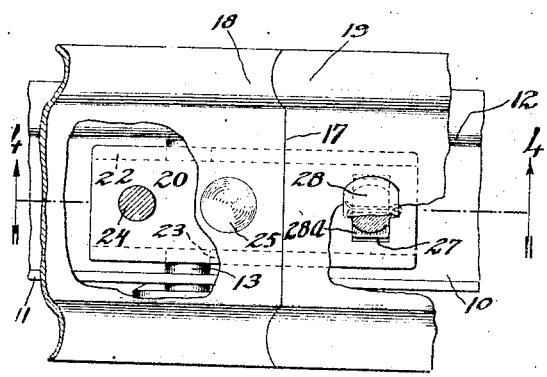
Fig. 2 is a plan view of a portion of a rim with the latch secured thereto, with parts broken away.
Figure 3:
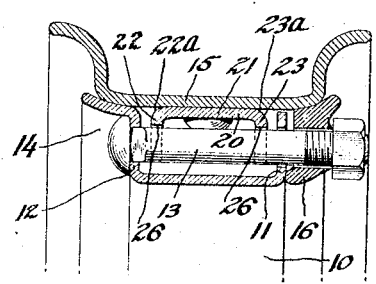
Fig. 3 is a section on line 3—3 of Fig. 1.
Figure 4:
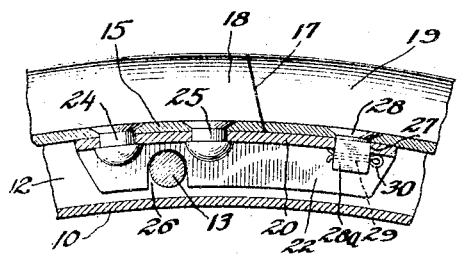
Fig. 4 is a section on line 4—4 of Fig. 2.

The end 19 of the rim is provided with suitable means for cooperating with the latch member for holding the rim ends in operative position. Any suitable means may be provided for this purpose. As shown, the web portion 21 of the free end of the latch is provided with an oblong opening 27 arranged with its longer axis transversely to the plane of said rim. The rim end 19 is provided with a stud 28 which is rigidly secured thereto. The free end 28ᵃ of said stud is enlarged and the enlargement made oblong in cross section to engage in the corresponding opening in said latch, as clearly indicated in Fig. 2 of the drawing. By making the free end of the stud oblong in cross section with the major axis extending transversely to the latch, the side of the stud will present a comparatively long bearing surface for the engagement of the latch which will not only resist rapid wear and the consequent separation of the rim ends but will reduce to a minimum the relative pivotal or rocking movement between said ends.

The length of the stud 28 is considerably greater than the thickness of the material from which the latch is made and is provided with a transverse aperture 29 through its free end. The aperture 29 is arranged in the plane of the rim whereby suitable fastening means such as the cotter pin 30 may be more readily inserted therein for retaining the latch 20 on the pin 28. Attention is directed to the fact that by making the stud 28 materially longer than the thickness of the web 21 the latch 20 is not likely to become detached from said stud even though the cotter pin 30 be dispensed with.

Attention is also directed to the fact that by the use of a cotter pin 30 for securing the latch on the stud 28 the use of turn buttons or other movable fastening members for securing the latch and stud in engagement are dispensed with. This is an important feature of the invention because as heretofore constructed the usual fastening members such as nuts, hinged or pivoted latches and the like cause more or less trouble due to their rusting, breaking, and other difficulties incident to their use.

Figure 5:
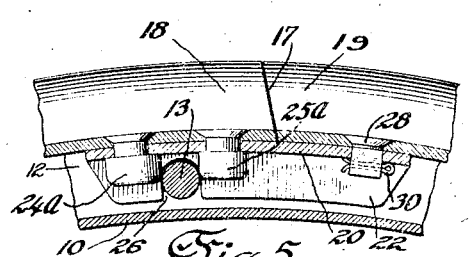
Fig. 5 is a section similar to Fig. 4 of a portion of a rim showing a modified form of the device.

In Fig. 5 is shown a modified form of construction. This form of the device differs from that shown in Figs. 1 to 4 inclusive in that the heads of the rivets 24ᵃ and 25ᵃ are so formed that they will engage at each side of the wedge bolt 13 at a point between the flanges of said felloe and are adapted to cooperate with the recessed flanges 22 and 23 of the latch to form a driver for the demountable rim.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

What I claim is:

1. In a device of the class described, a transplit rim, a channel shaped latch secured to one end of said rim and provided with an oblong opening in its free end, the longitudinal axis of said opening extending transversely to said rim, a correspondingly shaped stud carried by the other end of said rim for engaging said opening, said latch being formed from sheet metal by bending the same into channel shape whereby the curved corners formed at the bends afford means for facilitating the entrance of a tool between the latch and rim for detaching said latch from said stud, said flanges being provided with bolt engaging recesses whereby said latch may form the sole driving means for said rim.

2. A split rim having a pin on its inner surface adjacent one end, and a channel iron extending from the other end of the rim across the joint and having an opening in the bottom of the channel to engage the pin.

In testimony whereof I affix my signature.

FRANK W. SCHMIDT.